United States Patent
Sessions

(10) Patent No.: US 9,982,762 B2
(45) Date of Patent: May 29, 2018

(54) DIFFERENTIAL CONICAL DRIVE

(71) Applicant: Liftwave, Inc., Somerville, MA (US)

(72) Inventor: Blake Sessions, Cambridge, MA (US)

(73) Assignee: Liftwave, Inc., Somerville, MA (US)

( * ) Notice: Subject to any disclaimer, the term of this patent is extended or adjusted under 35 U.S.C. 154(b) by 227 days.

(21) Appl. No.: 14/840,435

(22) Filed: Aug. 31, 2015

(65) Prior Publication Data

US 2016/0091065 A1    Mar. 31, 2016

Related U.S. Application Data

(63) Continuation of application No. 14/339,947, filed on Jul. 24, 2014, now Pat. No. 9,121,481.

(60) Provisional application No. 61/858,585, filed on Jul. 25, 2013, provisional application No. 62/003,971, filed on May 28, 2014.

(51) Int. Cl.
   *F16H 19/06*    (2006.01)
(52) U.S. Cl.
   CPC ..... *F16H 19/0618* (2013.01); *F16H 19/0631* (2013.01); *F16H 2019/0609* (2013.01); *F16H 2019/0627* (2013.01); *Y10T 74/18848* (2015.01)
(58) Field of Classification Search
   CPC ......... Y10T 74/18848; Y10T 74/18832; Y10T 74/1836; F16H 19/06; F16H 2019/0609
   USPC ............... 474/64, 65; 74/89.2, 89.22
   See application file for complete search history.

(56) References Cited

U.S. PATENT DOCUMENTS

| | | | | |
|---|---|---|---|---|
| 222,406 | A | * 12/1879 | Johnson | B63H 25/10 114/160 |
| 576,779 | A | * 2/1897 | Ettenger et al. | F16H 19/06 14/71.1 |
| 1,928,532 | A | * 9/1933 | Gillespie | F04B 47/00 254/334 |
| 2,050,886 | A | 8/1936 | Hatmaker | |

(Continued)

FOREIGN PATENT DOCUMENTS

| DE | 1020090 17 503 | 10/2010 |
|---|---|---|
| DE | 1020100 60 153 | 2/2012 |

OTHER PUBLICATIONS

International Search Report and Written Opinion for PCT Application No. PCT/US2014/047994 mailed Oct. 16, 2014 (10 pages).

(Continued)

*Primary Examiner* — Henry Y Liu
(74) *Attorney, Agent, or Firm* — Fish & Richardson P.C.

(57) ABSTRACT

The present disclosure provides differential drive assemblies and methods of making and operating differential drive assemblies. The differential drive assembly includes a rotor having a rotor axis about which the rotor is configured to rotate. The rotor has a peripheral wall portion encircling the rotor axis that is positioned a varying distance radially outward from the rotor axis. The differential drive assembly also includes a base coupled to the rotor. That includes a first plurality of pulleys and a carriage movably coupled to the base that includes a second plurality of pulleys and is movable with respect to the base. The differential drive assembly includes a rope wound about the rotor. The rope extends from the peripheral wall portion of the rotor to the second plurality of pulleys. The rope extends from the second plurality of pulleys to the first plurality of pulleys to form a continuous rope circuit.

9 Claims, 17 Drawing Sheets

(56) References Cited

U.S. PATENT DOCUMENTS

| | | | | |
|---|---|---|---|---|
| 2,435,787 A * | 2/1948 | Knight | G09F 19/10 254/285 |
| 2,491,341 A * | 12/1949 | Tillman | H01F 21/00 74/10.7 |
| 2,598,709 A * | 6/1952 | Morris | E05F 15/686 160/193 |
| 2,712,919 A * | 7/1955 | Calvert | B66D 1/02 254/364 |
| 2,859,629 A * | 11/1958 | Parker | F16C 1/12 178/34 |
| 2,941,249 A * | 6/1960 | Rogers | B30B 7/02 100/199 |
| 3,044,312 A * | 7/1962 | Hall | B66D 3/02 211/103 |
| 3,141,343 A * | 7/1964 | Rieckenberg | B60S 1/18 15/250.25 |
| 3,273,408 A * | 9/1966 | Ernst | B23Q 1/4804 400/322 |
| 3,491,603 A * | 1/1970 | Harris | G05G 19/00 346/139 B |
| 3,500,692 A * | 3/1970 | Parker | F16H 19/06 346/117 A |
| 3,521,499 A * | 7/1970 | Keith | B01L 3/569 251/294 |
| 3,739,649 A * | 6/1973 | Pacini | B23Q 17/22 74/89.22 |
| 3,777,577 A * | 12/1973 | Giacomello | F16H 7/02 474/167 |
| 3,804,370 A | 4/1974 | Woodard | |
| 3,994,476 A * | 11/1976 | van Gennep | B66D 5/20 188/134 |
| 4,060,149 A * | 11/1977 | Henley | F16H 19/025 182/133 |
| 4,272,997 A * | 6/1981 | Groth | B23K 37/0247 74/89.22 |
| 4,396,919 A * | 8/1983 | Speicher | H01Q 3/08 343/765 |
| 4,494,256 A * | 1/1985 | Radtke | E04H 4/101 160/265 |
| 4,526,050 A * | 7/1985 | Johnson | F16H 19/0672 74/506 |
| 4,593,571 A * | 6/1986 | Schwarz | F16H 19/0654 74/111 |
| 4,804,285 A * | 2/1989 | Bradford | B41J 19/005 400/313 |
| 4,843,921 A * | 7/1989 | Kremer | A61F 2/54 74/89.2 |
| 4,850,606 A * | 7/1989 | Weisgerber | B62D 3/02 180/444 |
| 4,912,996 A | 4/1990 | Heidelberg | |
| 4,926,973 A * | 5/1990 | Smith | A61G 3/063 187/213 |
| 4,957,014 A * | 9/1990 | Burke | F16H 19/0622 346/139 B |
| 5,149,057 A * | 9/1992 | Meurer | B01D 21/04 210/527 |
| 5,205,793 A * | 4/1993 | Jones | F16H 55/50 474/141 |
| 5,331,862 A * | 7/1994 | Baginski | F16H 19/06 74/89.22 |
| 5,687,632 A | 11/1997 | Sugawa | |
| 5,752,811 A | 5/1998 | Petro | |
| 5,820,062 A * | 10/1998 | Menegatto | B65H 54/2821 242/481.3 |
| 6,046,563 A * | 4/2000 | Moreyra | B25J 9/1689 318/560 |
| 6,234,036 B1 * | 5/2001 | Kopko | F16H 19/006 242/388.6 |
| 6,280,358 B1 * | 8/2001 | Hormann | F16H 7/04 254/387 |
| 6,679,247 B1 * | 1/2004 | Gozikowski | F24J 2/045 126/621 |
| 6,981,729 B2 * | 1/2006 | Steury | B60P 3/34 296/171 |
| 7,360,911 B2 * | 4/2008 | Menke, Sr. | B60Q 1/2611 362/287 |
| 7,997,158 B2 * | 8/2011 | Grossart | F16H 19/06 74/89.2 |
| 8,191,296 B2 * | 6/2012 | Xu | G09F 7/20 248/157 |
| 8,516,913 B2 * | 8/2013 | Jones | F16H 19/06 474/84 |
| 8,517,348 B2 * | 8/2013 | Smith | B66D 1/38 242/397.3 |
| 8,689,636 B2 * | 4/2014 | Bednarczyk | G01M 11/088 73/800 |
| 9,121,481 B2 | 9/2015 | Sessions | |
| 2005/0061092 A1 * | 3/2005 | Meier | B25J 9/026 74/89.22 |
| 2006/0118248 A1 * | 6/2006 | Anderson | E06B 9/262 160/84.04 |
| 2013/0255410 A1 * | 10/2013 | Lee | F16H 19/08 74/89.22 |
| 2014/0318007 A1 * | 10/2014 | Hogan | F16M 11/18 47/39 |
| 2015/0027249 A1 | 1/2015 | Sessions | |
| 2017/0002905 A1 | 1/2017 | Sessions | |

OTHER PUBLICATIONS

International Preliminary Report on Patentability for PCT Application No. PCT/US2014/047994 dated Jan. 26, 2016, 7 pages.

International Search Report and Written Opinion in International Application No. PCT/US2016/40825, dated Oct. 24, 2016, 12 pages.

International Search Report and Written Opinion in International Application No. PCT/US2016/40677, dated Dec. 15, 2016, 11 pages.

* cited by examiner

DIFFERENTIAL CONICAL DRIVE

CROSS REFERENCE TO RELATED APPLICATIONS

The present application is a continuation of U.S. Ser. No. 14/339,947, filed Jul. 24, 2014, which claims priority to U.S. Provisional Application No. 61/858,585 filed Jul. 25, 2013, entitled "Differential Conical Drive" and U.S. Provisional Application No. 62/003,971, filed May 28, 2014, entitled "Differential Drive," which applications are hereby incorporated herein by reference in their entireties.

TECHNICAL FIELD

The present application relates generally to the field of drive systems.

BACKGROUND

The Chinese windlass is a drive assembly that uses a drum arrangement such as double-drum arrangement in order to drastically reduce the motion evident at end of a winch. Windlasses exist in varying forms and are useful predominantly because of their high reduction capacity. The Chinese windlass greatly reduces the driving torque on the drum, as compared to a standard winch. This is particularly useful when driven by hand or by an electric motor, both of which are capable of putting out relatively low torque.

The conical windlass, illustrated in FIG. 1, is a variant of the double drum windlass. The conical windlass includes a rope wrapped around a conical drum a few times before it passes down and around a pulley to meet itself once again, forming a closed loop of rope. When the crank connected to the conical drum is turned, the coils on the drum shift up and down the drum, and change in size. As they grow larger, the free length of rope between the coils and the pulley shrinks or expands in conservation of the total rope length. The maximally contracted state is at the largest section of the conical drum, at which the pulley and its hook will be at their highest point.

SUMMARY

Various embodiments disclosed herein provide differential drive assemblies and methods of manufacturing and operating differential drive assemblies. The embodiments described herein address a number of issues present with the conical windlass arrangement. The embodiment described herein serves to compact the form of a differential drive by aligning the drum axis with both the free length of rope and the axis of linear motion. The embodiments described herein provide symmetric loading arrangements that significantly reduce stresses in the system, resulting in lower frictional loss and a more robust construction, even when made with plastic materials. The embodiment described herein provide a means of using a modern electric motor to drive linear motion in a highly efficient manner, with the ability to create a non-linear mechanical advantage profile over the many revolutions of motion that are evident. This non-linear cam-like feature provides holding positions that require no torque of the motor in order to hold a load as described further herein. This non-linear cam-like feature also produce nonlinear drive behaviors such as an output that slows down and grows stronger as the stroke is executed; a feature that is particularly useful in linkage applications.

Particular embodiments provide a differential drive assembly including a rotor having a rotor axis about which the rotor is configured to rotate. The rotor has a peripheral wall portion encircling the rotor axis. The peripheral wall portion is positioned a distance radially outward from the rotor axis. The distance radially outward of the peripheral wall portion varies along a length of the axis. The differential drive assembly also includes a base coupled to the rotor. The base includes a first plurality of pulleys. The differential drive assembly includes a carriage movably coupled to the base. The carriage includes a second plurality of pulleys and is movable with respect to the base. The differential drive assembly includes a rope wound about the rotor. The rope extends tangentially from the peripheral wall portion of the rotor to the second plurality of pulleys. The rope extends from the second plurality of pulleys to the first plurality of pulleys to form a continuous rope circuit.

In particular embodiments, the differential drive assembly also includes an actuator configured to rotate the rotor about the rotor axis. The rotor rotates with respect to the base and the carriage. The actuator includes an electric motor, in accordance with particular embodiments. The electric motor may be coupled to the base. The electric motor includes may include a servo motor. In particular embodiments, the rotor includes a conical rotor where the distance of the peripheral wall portion radially outward from the rotor axis varies linearly along the length of the axis. The distance of the peripheral wall portion radially outward from the rotor axis varies non-linearly along the length of the axis, in accordance with particular embodiments. The peripheral wall portion may include a spiral groove. The rope may be wound about the rotor positioned in a portion of the spiral groove. In particular embodiments, the peripheral wall portion includes a pair of parallel spiral grooves. The rope may be wound about the rotor positioned in a portion of both spiral grooves. The first plurality of pulleys includes 2 pulleys, in accordance with particular embodiments. The second plurality of pulleys includes 4 pulleys, in accordance with particular embodiments. The first plurality of pulleys may be configured to rotate about at least one axis extending in a direction orthogonal to the rotor axis. In particular embodiments, the base is movably coupled to the carriage. The base is movably coupled to the carriage via at least one guide shaft of the base, in accordance with particular embodiments. The rotor may be positioned in the base. In The rod ends are configured for coupling with a device or component for actuation of the component via the linear power provided thereto, the base includes a first coupler and wherein the carriage includes a second coupler.

Particular embodiments provide a method of operating a differential drive assembly. The method includes actuating a rotary actuator coupled to a rotor. The method also includes causing the rotor to rotate about a rotor axis in response to actuation of the rotary actuator. The rotor has a peripheral wall portion encircling the rotor axis. The peripheral wall portion is positioned a distance radially outward from the rotor axis. The distance radially outward of the peripheral wall portion varies along a length of the axis. The method further includes causing a carriage movably coupled to a base. The base is coupled to the rotor to move along the axis with respect to the base. The base includes a first plurality of pulleys. The carriage includes a second plurality of pulleys. The carriage moves along the axis with respect to the base via a change in position of a rope on the rotor. The rope is wound about the rotor and extends from the peripheral wall portion of the rotor to the second plurality of pulleys. The rope extends from the second plurality of pulleys to the first plurality of pulleys to form a continuous rope circuit.

In particular embodiments, the rope extends tangentially from the peripheral wall portion of the rotor to the second plurality of pulleys. The rotor includes a conical rotor where the distance of the peripheral wall portion radially outward from the rotor axis varies linearly along the length of the axis, in accordance with particular embodiments. The peripheral wall portion may include a pair of parallel spiral grooves. The rope is wound about the rotor and positioned in a portion of both spiral grooves. The carriage moves along the axis with respect to the base via a change in position of the rope in both spiral grooves. In particular embodiments, the rotary actuator includes an electric motor.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawing primarily is for illustrative purposes and is not intended to limit the scope of the inventive subject matter described herein. The drawing is not necessarily to scale; in some instances, various aspects of the inventive subject matter disclosed herein may be shown exaggerated or enlarged in the drawings to facilitate an understanding of different features. In the drawing, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and exemplary embodiments of, inventive systems, methods and components a differential drive assembly.

Figure 1:
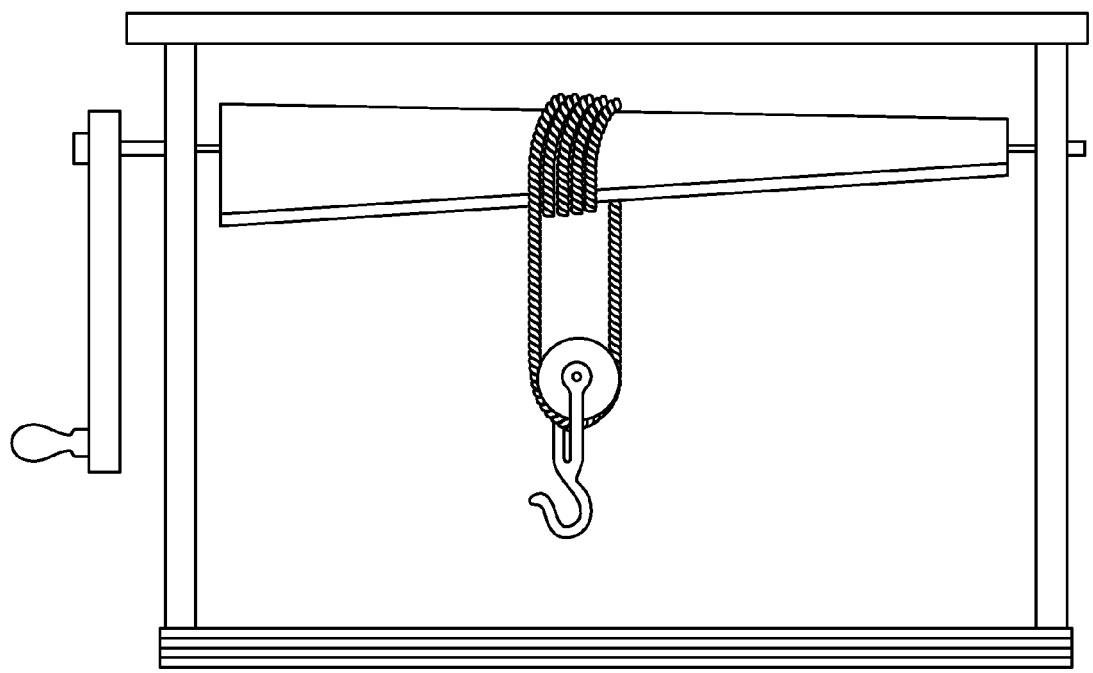
FIG. 1 is a side view of conical windlass according to the prior art.
Figure 2:
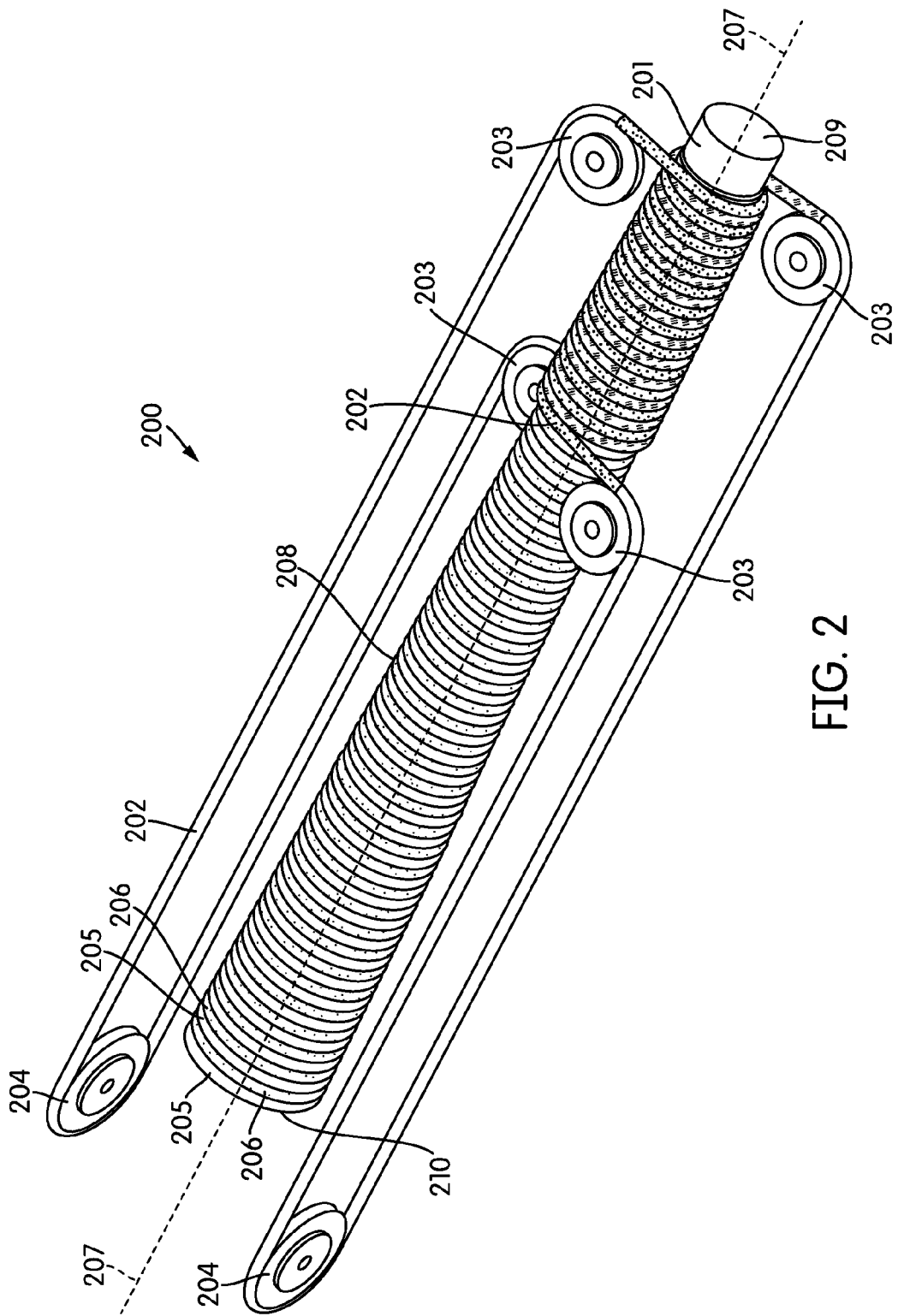
FIG. 2 is top perspective view of a differential drive in an expanded state in accordance with exemplary inventive embodiments.

FIG. 2 is top perspective view of a differential drive in an expanded state in accordance with exemplary inventive embodiments. Differential drive assembly 200 includes a rotor 201 having a single tensile element 202 that is of a closed-loop form, often referred to as a "belt" in common practice. The rotor 201 is configured to rotate about rotor axis 207. The rotor 201 includes a peripheral wall portion 208 whose radial distance outward from the rotor axis 207 varies along a length of the rotor axis 207 from a top rotor end 209 of the rotor 201 to a bottom rotor end 210 of the rotor 201. In the illustrated embodiment, the radial distance of the peripheral wall portion 208 of the rotor 201 varies such that the rotor 201 is configured in a conical or tapered form. As discussed further herein, the tapered nature of the rotor 201 need not be constant (see FIGS. 13-16). The peripheral wall 208 of the rotor 201 includes two separate grooved channels 205 and 206, shown in distinct shades for clarity. The two separate grooved channels 205 and 206 extend along the peripheral wall 208 of the rotor 201 in parallel spirals. The tensile element 202 is wrapped around the rotor 201. The tensile element 202 may include a rope, a cable, a cord or other flexible elements configured for winding and pulling through pulley components and may be composed of various materials including, but not limited to, steel, high-modulus polyethylene (HMPE), nylon, polyester, aramid, and other high-performance rope fibers. Two sections of the tensile element 202, which are positioned in the distinct grooved channels 205 and 206, are also shown in distinct shades of grey. The two sections of the single tensile element 202 are also interlaced. In the illustrated example embodiment, the tensile element 202 includes approximately 12 wraps in each of the grooved channels 205 and 206. The tensile element 202 extends from the rotor 201 to a first plurality of pulleys, namely redirection pulleys 203. In the illustrated embodiment, the differential drive assembly 200 includes 4 redirection pulleys 203. The tensile element extends from and/or to each of the redirection pulleys 203 and over (in a direction including a component in the direction of extension of the rotor axis 207) to a second plurality of pulleys, namely base pulleys 204. The tensile element 202 extends about the rotor 201, the redirection pulleys 203, and the base pulleys 204 to form a single continuous circuit, in a manner that renders the motion of the tensile element 202 fully recyclable. In FIG. 2, the differential drive 200 is in an expanded state. Accordingly, the redirection pulleys 203 are spaced further apart from the base pulleys 204 than they are in the contracted state.

Figure 3:
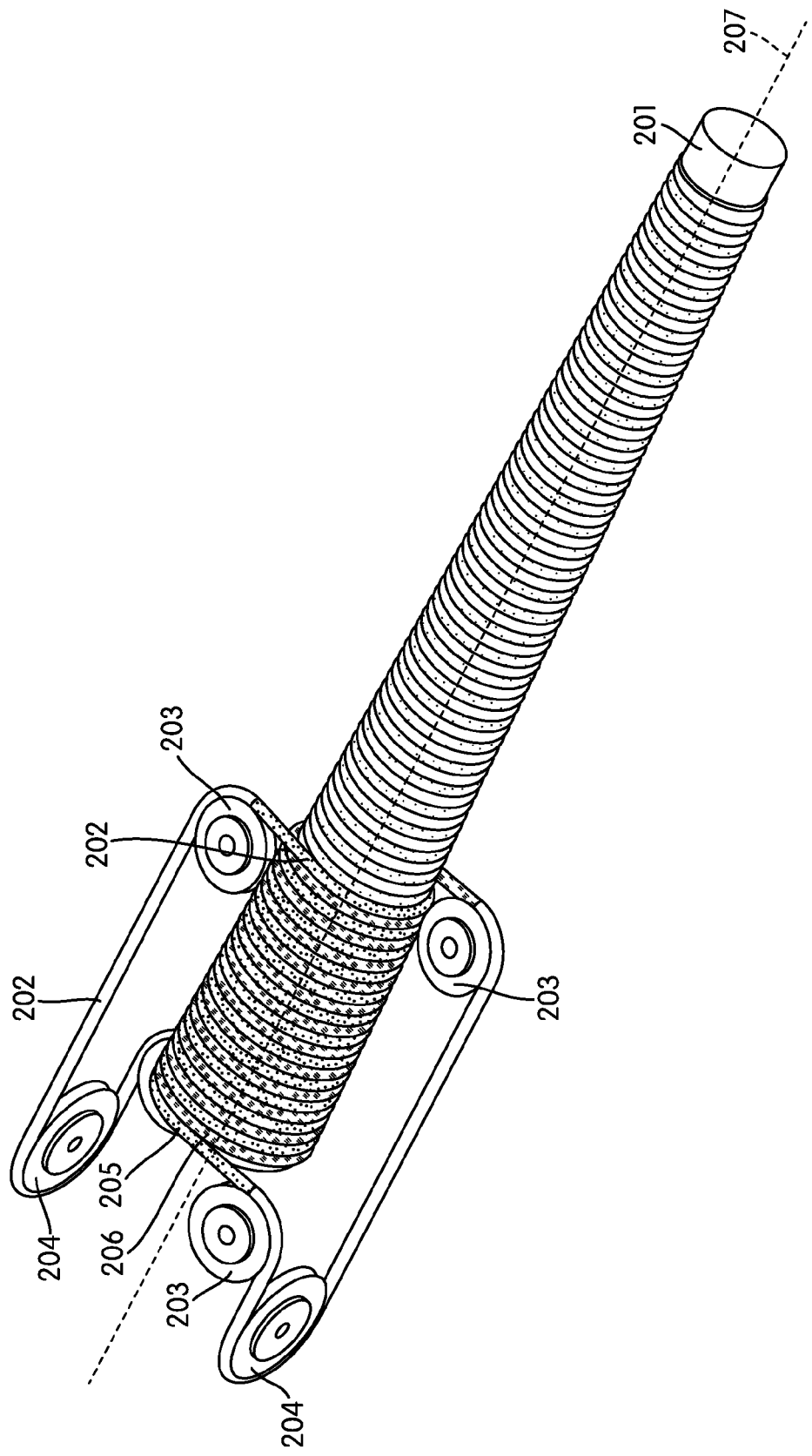
FIG. 3 is top perspective view of the differential drive of FIG. 2 in the contracted state.

FIG. 3 is top perspective view of the differential drive of FIG. 2 in the contracted state. With respect to FIG. 2, the redirection pulleys 203 are moved closer together to the base pulleys 204 than they are in the expanded state of the differential drive 200 illustrated in FIG. 2. The differential drive 200 is moved between the expanded state and the contracted state via rotation of the rotor 201 about the rotor axis 207. As the differential drive 200 is moved from the expanded state to the contracted state the coils of the tensile element 202 move down the rotor 201 along the rotor axis 207 in a direction extending from the top rotor end 209 to the bottom rotor end 210 (i.e. towards the thicker section or section of the rotor having the peripheral wall a greater radial distance outward from the rotor axis 207). It should be noted that the top end 209 may be thicker than the bottom end 210 in example embodiments. As the coils of the tensile element 202 move down the rotor free length of tensile element 202 (e.g. the portion between the redirection pulleys 203 and the base pulleys 204), the free length shrinks as the diameter of the coils expand and the redirection pulleys 203 move closer to the base pulleys 204.

As the rotor 201 is rotated, linear power is drawn from the changing differential between the redirection pulleys 203 and the base pulleys 204 in a direction that is generally aligned with the rotor axis 207 and the rotor 201. A torque is evident on the rotor 201 that is effectively the difference in radii of the sections of the tensile element 201 entering and exiting the rotor 201, multiplied by the tension in the tensile element 201 and multiplied by a factor of 2 for the set of coils in each of the channels 205 and 206. This torque is what opposes the driving torque of the rotary source, such as an electric motor, as discussed further herein.

The differential drive 200 is configured such that with respect to FIG. 2 the rotor 201 has not shifted in FIG. 3 as drive transitioned from the expanded state to the contracted state and the redirection pulleys 203 moved closer to the base pulleys 204. In the illustrated embodiment, the angle of the taper of rotor 201 and the number of wraps of tensile element 202 about the rotor 201 have been chosen so that the rotor 201 may remain stationary along the rotor axis 207. However, in the general case, it will move along the rotor axis 207. This can be seen conceptually if one considers the rotor to be cylindrical in form, in which case the coils would remain the same size, the free length of belt would not change, and the rotor would shift to the right as it revolves (along the Z+ axis.) In an intermediary case, such as a shallower taper angle of the peripheral wall 208 of the rotor 201, both the rotor 201 and the redirection pulleys 203 will move in opposite directions. With a steeper taper angle of the peripheral wall 208 of the rotor 201 than depicted, the rotor 201 and the redirection pulleys 203 will both shift left as the free length of the tensile element 202 shrinks and the drive moves towards its contracted state. The illustrated embodiment allows for freedom of motion of the rotor 201 along rotor axis 207. The tension of the incoming and outgoing lines will provide a means of moving the rotor along its free axis when necessary.

Figure 4:
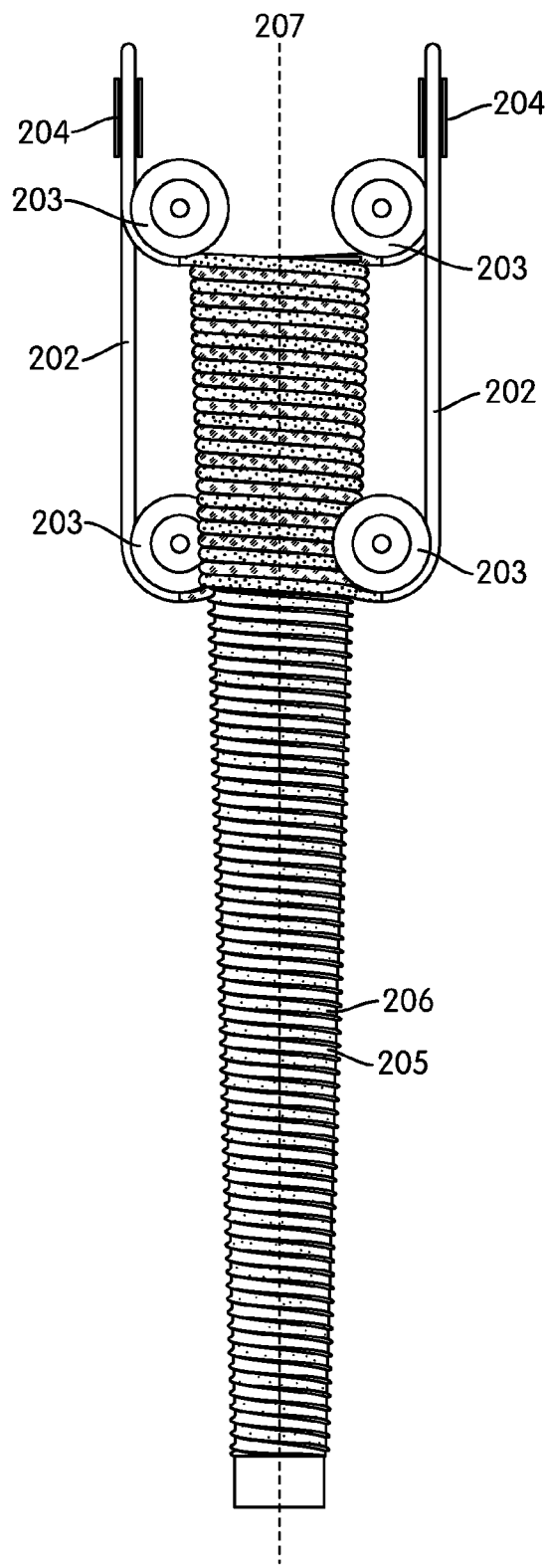
FIG. 4 provides a top view of the differential drive of FIG. 2.

FIG. 4 provides a top view of the differential drive of FIG. 2 in the contracted state.

Figure 5:
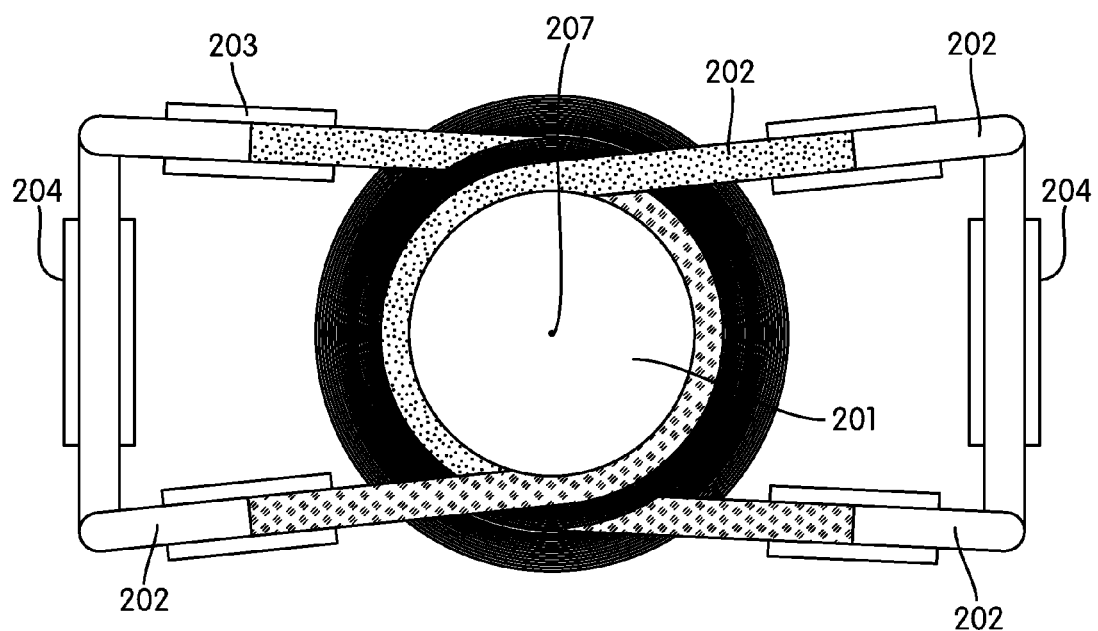
FIG. 5 shows a front end view of the differential drive of FIG. 2 in the expanded state.
Figure 6:
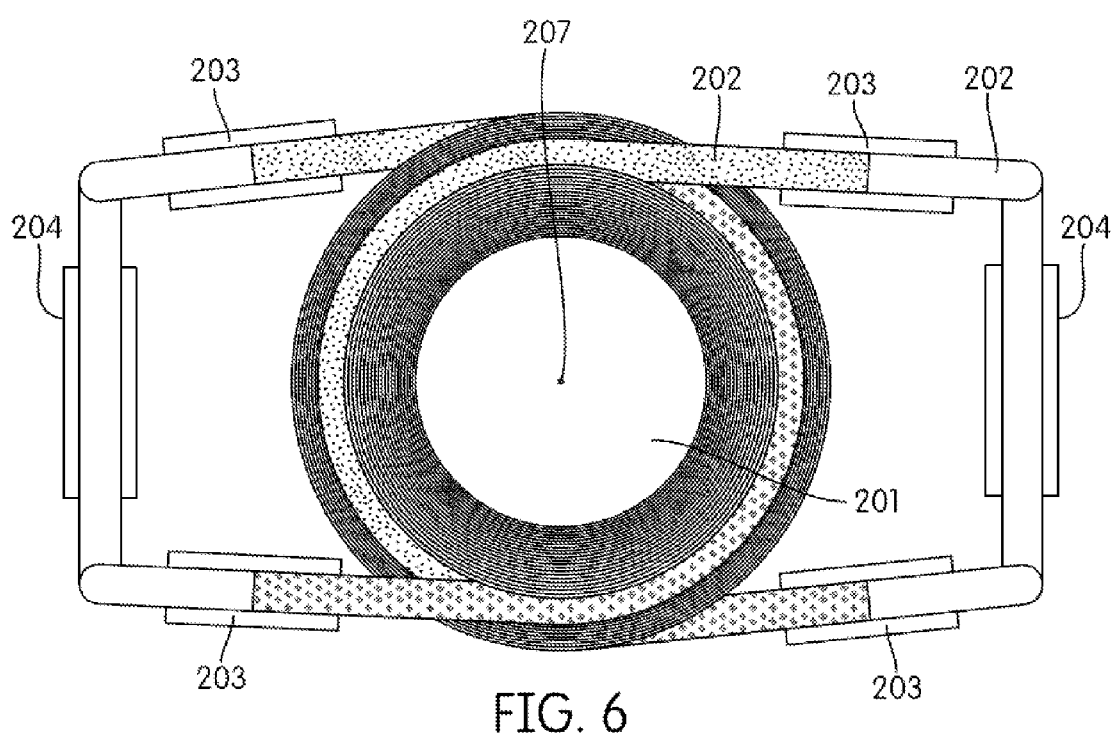
FIG. 6 illustrates a front end view of the differential drive of FIG. 2 in the contracted state.

FIG. 5 shows a front end view of the differential drive of FIG. 2 in the expanded state. In accordance with particular embodiments, the tensile element 202 extends from and/or to the rotor 201 in a direction that is substantially tangential to the section of the peripheral wall 208 of the rotor 201 from which the tensile element 202 extends. The tensile element extends from two of the redirection pulleys 203 (for example the two top redirection pulleys 203) and extends to the other two of the redirection pulleys 203 (for example the bottom two redirection pulleys 203). The four redirection pulleys 203, are approximately horizontal in this figure, are allowed to rotate about their own axis (extending in a direction into the page) as well as an axis that is approximately co-linear with its corresponding free-length section. Rotation of each redirection pulley 203 is evident when comparing the orientation of the redirection pulleys 203 of the differential drive 200 in the expanded state to the orientation of the redirection pulleys 203 in FIG. 6, which illustrates a front end view of the differential drive 200 in the contracted state. This configuration allows geometric compensation permitting the coils of the tensile element 202 about the rotor 201 to shrink and expand freely without undue stress exerted on the tensile element 202 and other components. A pulley carriage discussed further herein, facilitates the reorienting of the redirection pulleys 203 by permitting the redirection pulleys 203 to rotate thereon in accordance with exemplary inventive embodiments.

Particular embodiments include a differential drive that includes 6 pulleys, one belt, and one rotor with two interlaced grooves. In particular embodiments, these components are complemented by bodies that provide structural definition and rigidity to these components while permitting these components to move as discussed herein. The base pulleys 204 are free to rotate in the fixed frame. The rotor 201 is free to rotate about its axis 207, is driven by a rotational power source, and is free to move linearly along the rotor axis 207. Example embodiments, may constrain the rotor 201 from moving linearly along the rotor axis 207. A pulley carriage is also configured to travel along the rotor axis 207. The four redirection pulleys 203 are free to rotate about their own axes, which are configured to reorient. The redirection pulleys 203 are mounted to bodies that are affixed to the carriage, with a single rotational freedom that is generally aligned with its corresponding free-length section the tensile element 202 (See FIG. 5-6.)

FIGS. 7 through 12 depict example structural elements configured to facilitate the aforementioned motions.

Figure 7:
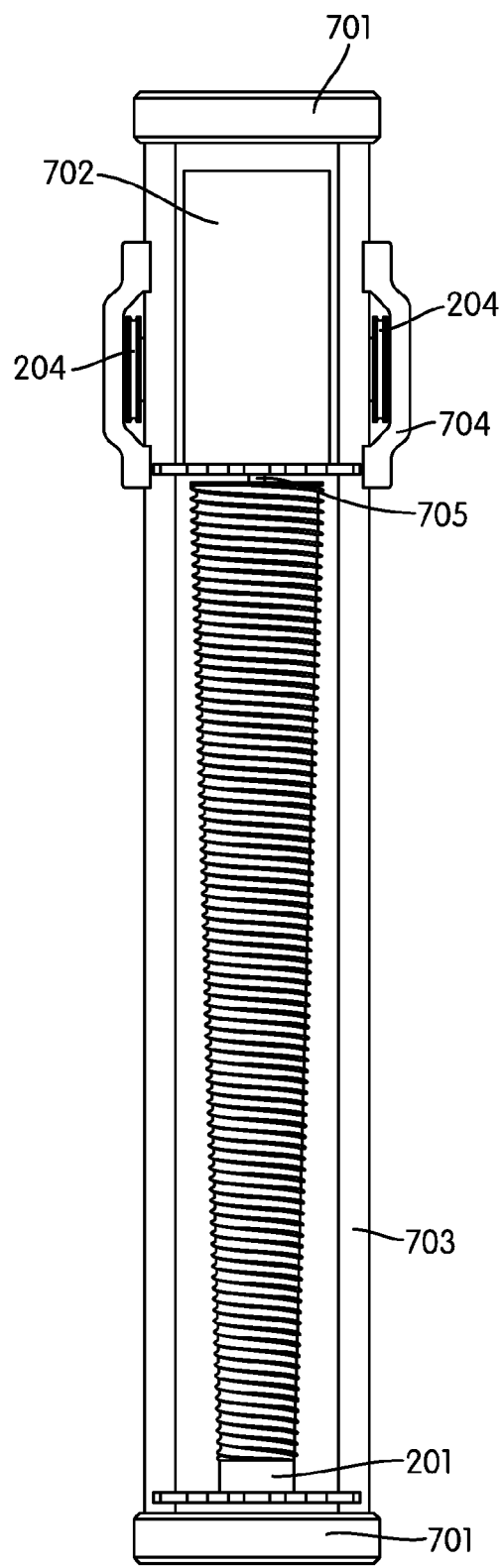
FIG. 7 is a top view of the differential drive of FIG. 2 including a base assembly, in accordance with exemplary inventive embodiments.
Figure 8:
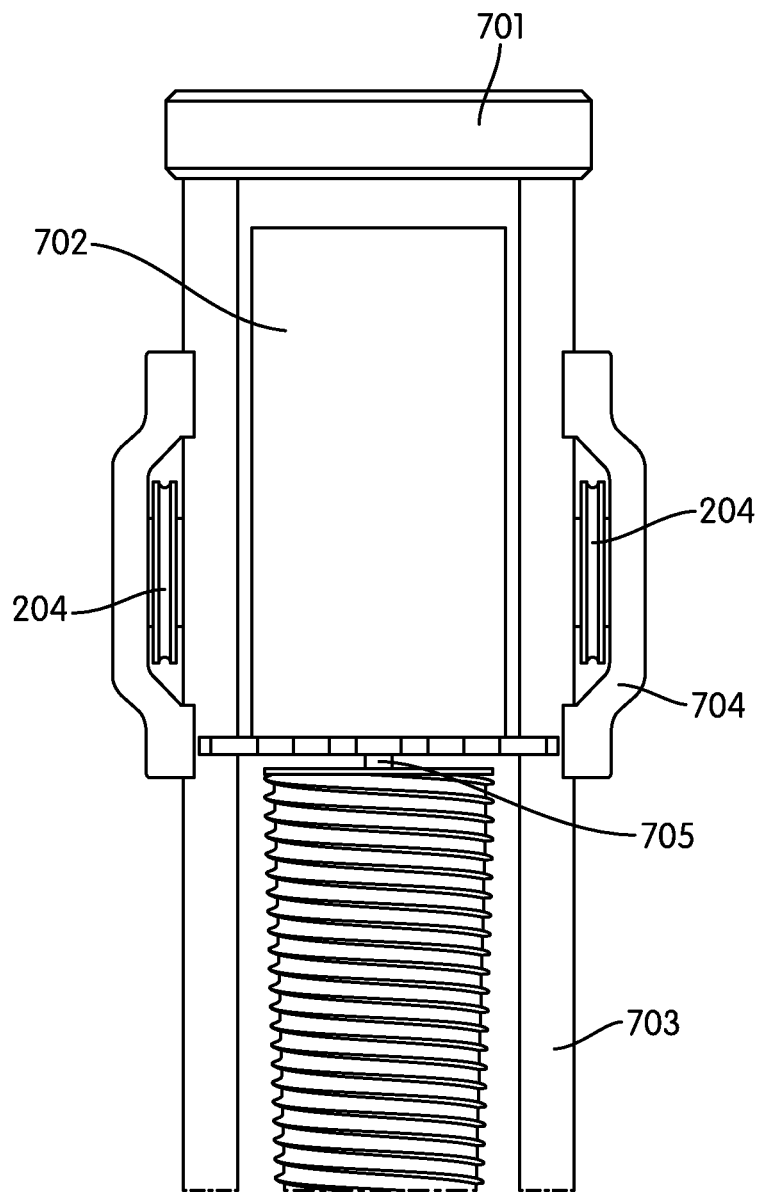
FIG. 8 provides a magnified view of an actuator of the differential drive of FIG. 7.
Figure 9:
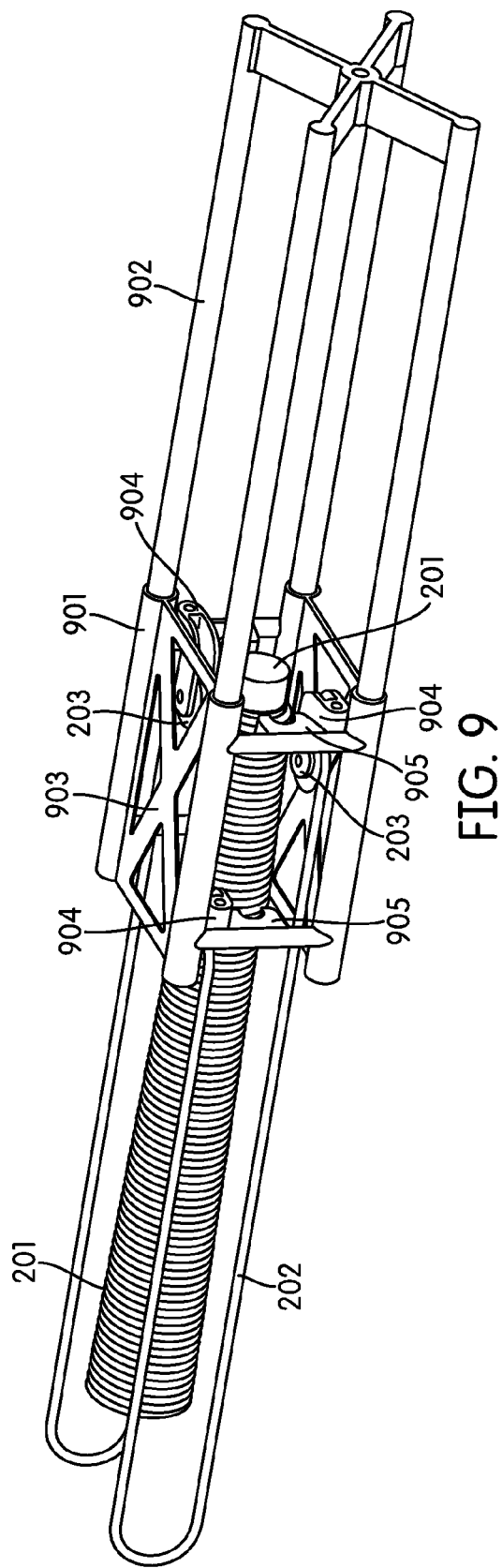
FIG. 9 shows a perspective view of the differential drive of FIG. 2 including a carriage assembly, in accordance with exemplary inventive embodiments.

FIG. 7 is a top view of the differential drive of FIG. 2 including a base assembly, in accordance with exemplary inventive embodiments. Base assembly 701 is coupled the rotor 201 in a manner that allows the rotor 201 to rotate about the rotor axis 207 and with respect to the base assembly 701. Base assembly 701 includes base pulley frames 704 housing the base pulleys 204 and including pulley shafts about which the base pulleys 204 rotate. In the illustrated embodiment, the base assembly 701 also houses rotary actuator 702, which includes, but is not limited to, an electric motor. In particular embodiments, the rotary actuator 702 includes a servo motor, a rotary piezo motor, a rotary hydraulic motor and a pneumatic motor. It should be noted that the embodiments described herein pertain to a system for translating rotary power to linear power and vice versa. If a rotary source is used in conjunction with various embodiments, it may be supplied in any form that supplies torque through finite rotation. FIG. 7 shows an example arrangement of the base assembly 701 that fixes the base pulleys 204 to a set of tubes 703 extending substantially parallel to the rotor axis 207 in a direction from the top rotor end 209 to the bottom rotor end 210, which function as guide-shafts (for the carriage 901 carrying the redirection pulleys 203 as shown in FIG. 9). A motor shaft 705 is affixed to the rotor 201, which is allowed to spin freely in the base assembly 701. Both the rotary actuator 702 and the rotor 201 ride on blocks that are free to shift along the principal axis, namely the rotor axis 207. Note that as shown, the gaps between the rotor 201 and the frame of the base assembly 701 are small to provide a more compact assembly. If linear motion of rotor 201 along the rotor axis 207 is desired the gaps between the frame of the base assembly and the rotor 201 may be increased in order to accommodate the linear rotor travel along the rotor axis 207. FIG. 8 provides a magnified view of an actuator of the differential drive of FIG. 7.

Figure 10:
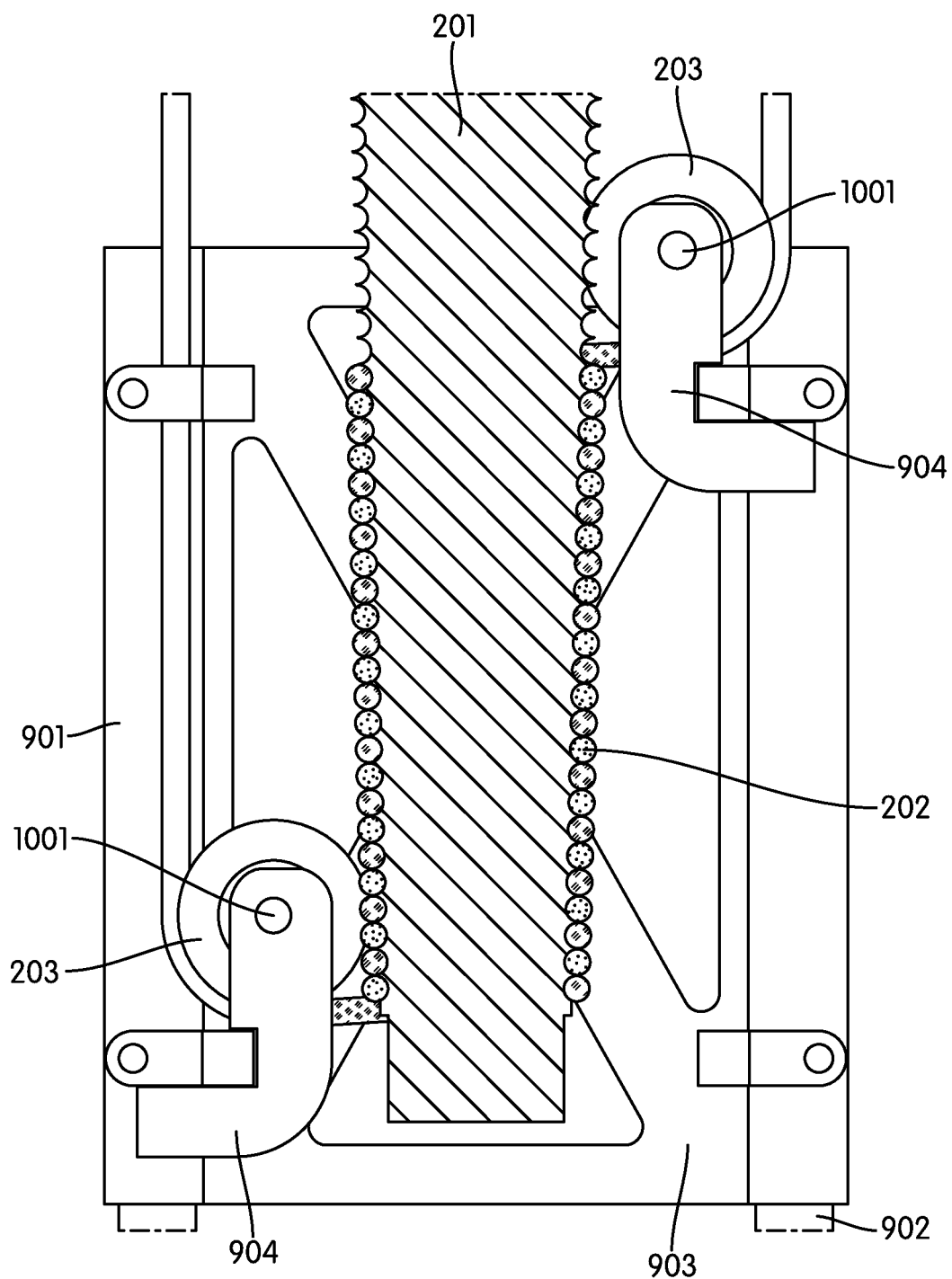
FIG. 10 illustrates a cross-sectional view of the carriage assembly of FIG. 9.

FIG. 9 shows a perspective view of the differential drive of FIG. 2 including a carriage assembly, in accordance with exemplary inventive embodiments. Carriage 901 shows an example embodiment of the carriage structure, which also moves linearly along the same principal axis, the rotor axis 207. Four pulley mounts 904 are configured to rotate about pins that connect the pulley mounts 904 to the carriage 901, each rotating to allow for coil expansion and contraction as described previously in connection with reorientation of the redirection pulleys 203 as the differential drive 200 moves between an expanded and contracted state (See FIGS. 5 and 6). The redirection pulleys 203 are rotationally coupled to the pulley mounts 904 to rotate about each individual and moving axis of each redirection pulley 203. Carriage 901 includes a cross brace 903 and frame extensions 902. Carriage 905 also includes carriage guides 905 configured to receive tubes 703 and maintain the carriage 901 moving along the rotor axis 207. In example embodiments carriage guides 905 may include bushings or bearings integrally formed as a part of the guide or as an independent element. The carriage guides 905 may be composed of a low friction material to permit free sliding along guide tubes 703 of the base assembly 701. FIG. 10 illustrates a cross-sectional view of the carriage assembly of FIG. 9 as well as cross sections of the pulleys 203 the rotor 201, and the coiled section of the tensile element 202. The pulley mounts 904 are more clearly shown in FIG. 10. The pulley mounts 904 carry the redirection pulley 203 such that the redirection pulleys 203 are configured to rotate about pins 1001. The pulley mounts 904 are configured to rotate with respect to carriage 901 for reorientation of the redirection pulleys during coil expansion and contraction of tensile element 202 as the differential drive 200 moves between an expanded and contracted state.

Figure 11:
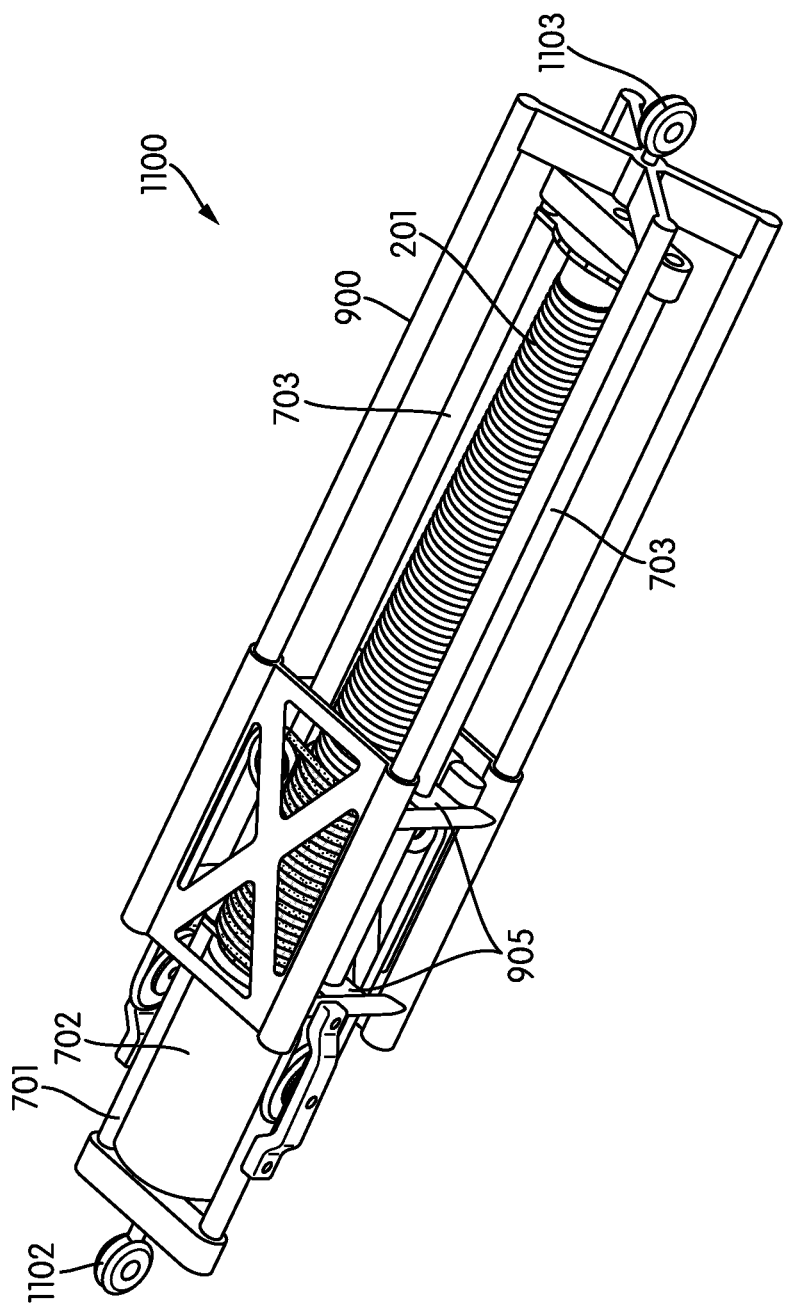
FIGS. 11 and 12 show perspective views of the differential drive of FIG. 2 including the carriage assembly of FIG. 9 coupled to the base assembly of FIG. 7, in accordance with exemplary inventive embodiments.
Figure 12:
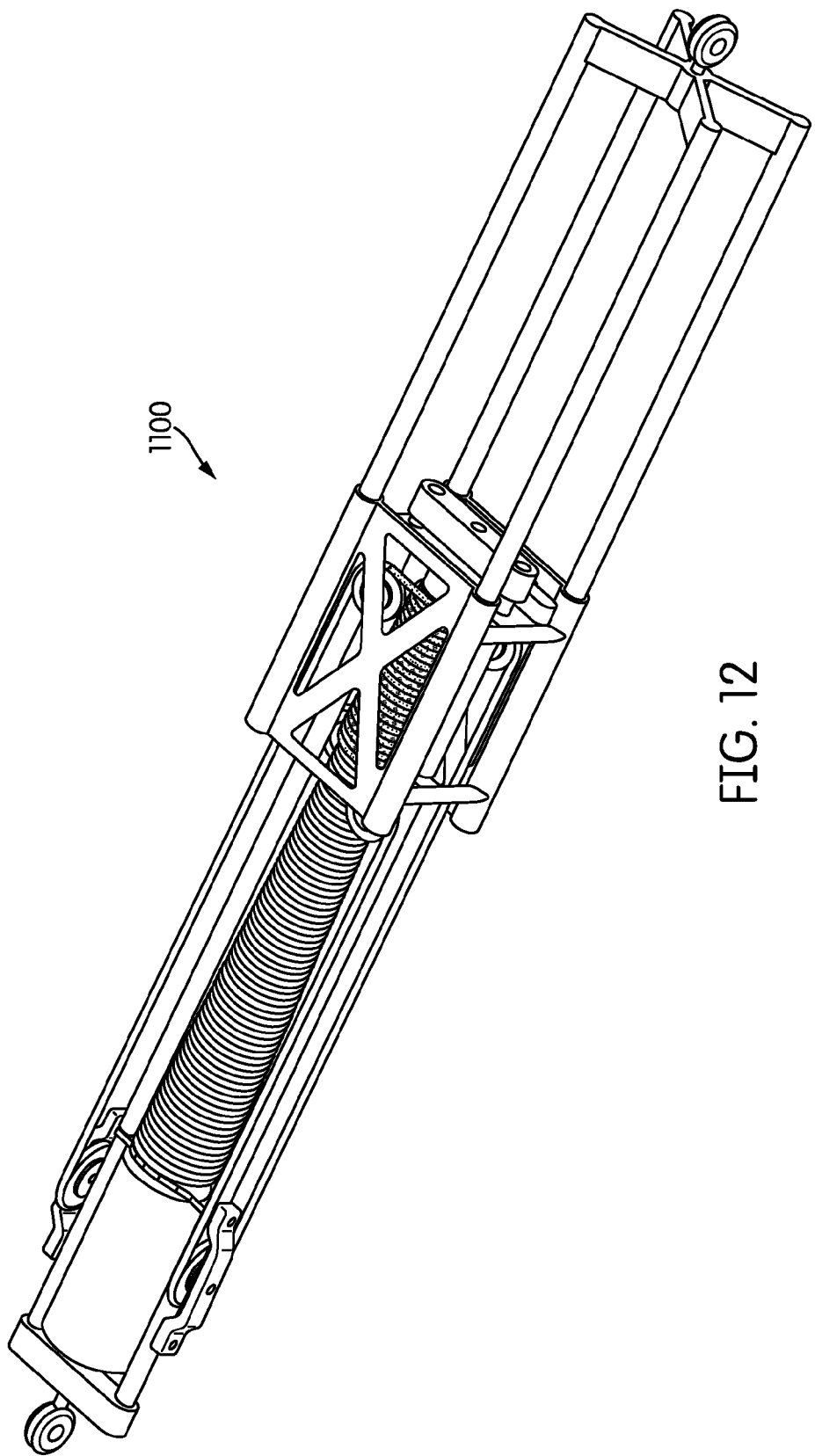

FIGS. 11 and 12 show perspective views of a differential drive assembly 1100, including differential drive of FIG. 2 coupled to the carriage 901 of FIG. 9 and coupled to the base assembly 701 of FIG. 7, in accordance with exemplary inventive embodiments. The differential drive assembly 1100 provides a linear actuator that is powered by the rotary actuator 702. The guide tubes 703 of the base assembly 701 are positioned in the carriage guides 905 of the carriage 901. A first rod end 1102 is affixed to the base assembly 701 that is shown in FIG. 7. A second rod end-1103 is affixed to the carriage 901. The second rod end 1103 moves linearly along the rotor axis 207 with respect to the first rod end 1102. Linear power is provided between these two rod ends 1102 and 1103. The rod ends are configured for coupling with a device or component for actuation of the component via the linear power provided thereto and may include a fastener or other attachment component or mechanism. An electric motor (or other rotational power source) drives the rod ends 1102 and 1103 towards each as the drive moves to the contracted state, rendering a contractile positive work output similar to a muscle. In accordance with example embodiments, work can also flow through the system in the reverse direction, for example, if the rod ends 1102 and 1103 are pulled apart and sufficient torque is not supplied to the motor, the system will back-drive and extend. FIG. 12 shows the differential drive assembly 1100 in its extended state. When the rotary actuator 702 is driven in an opposite direction the two rod ends 1102 and 1103 move away from each other (e.g. the differential drive in the expanded state).

One advantage of exemplary embodiments is the operability with a nonlinear drivetrain design. Most drivetrains, such as a screw or a gearbox, have a linear geometric relationship between the input and output. A screw, for example, provides the same lead at all points: every revolution of the nut results in the same amount of linear travel. This arrangement is not limited to geometric linearity. If the rotor itself is of a non-constant taper angle, it may exhibit non-constant drivetrain behaviors. Two examples follow.

Figure 13:
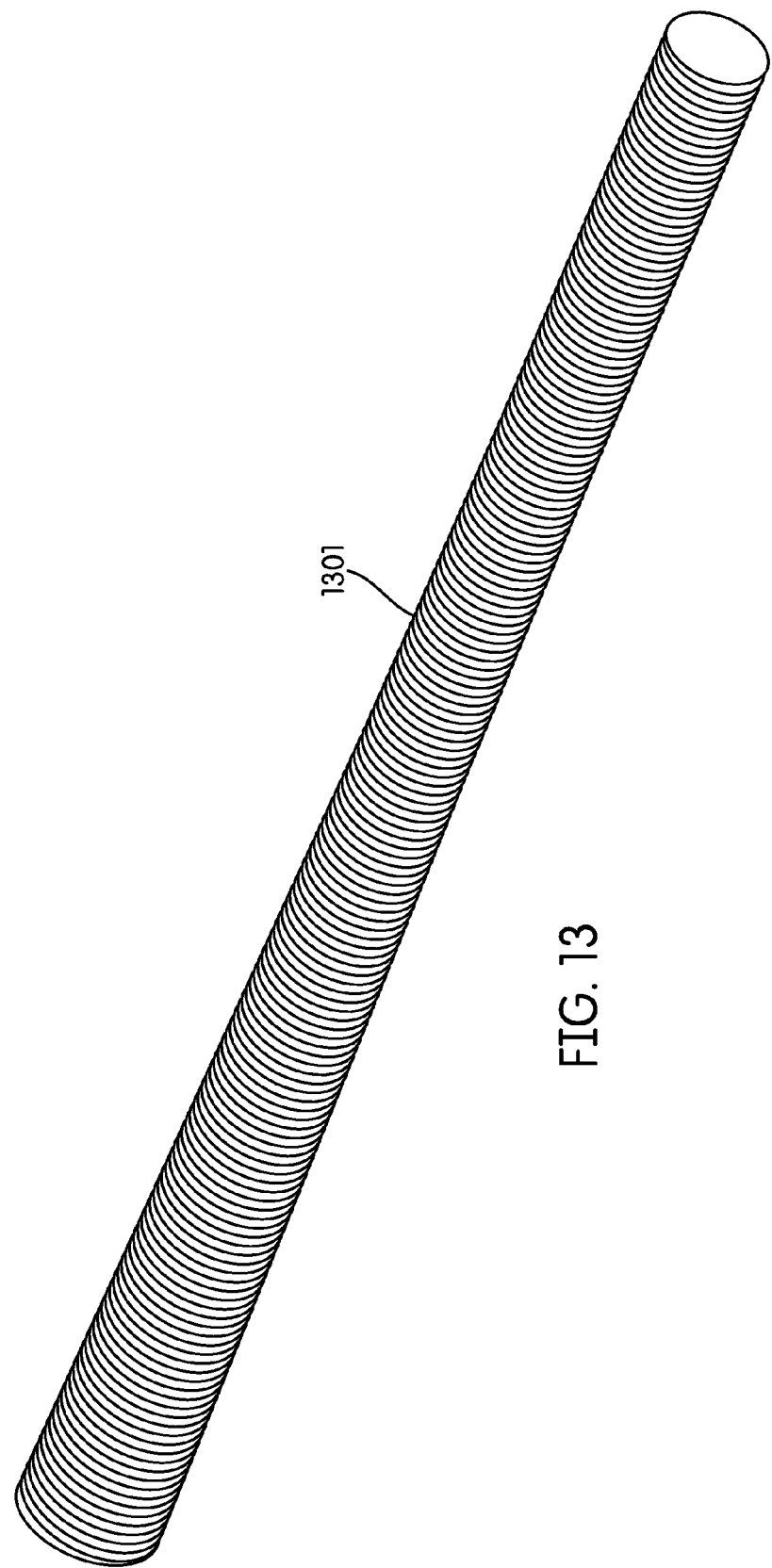
FIG. 13 depicts a differential drive including a non-linear rotor, in accordance with exemplary inventive embodiments.
Figure 14:
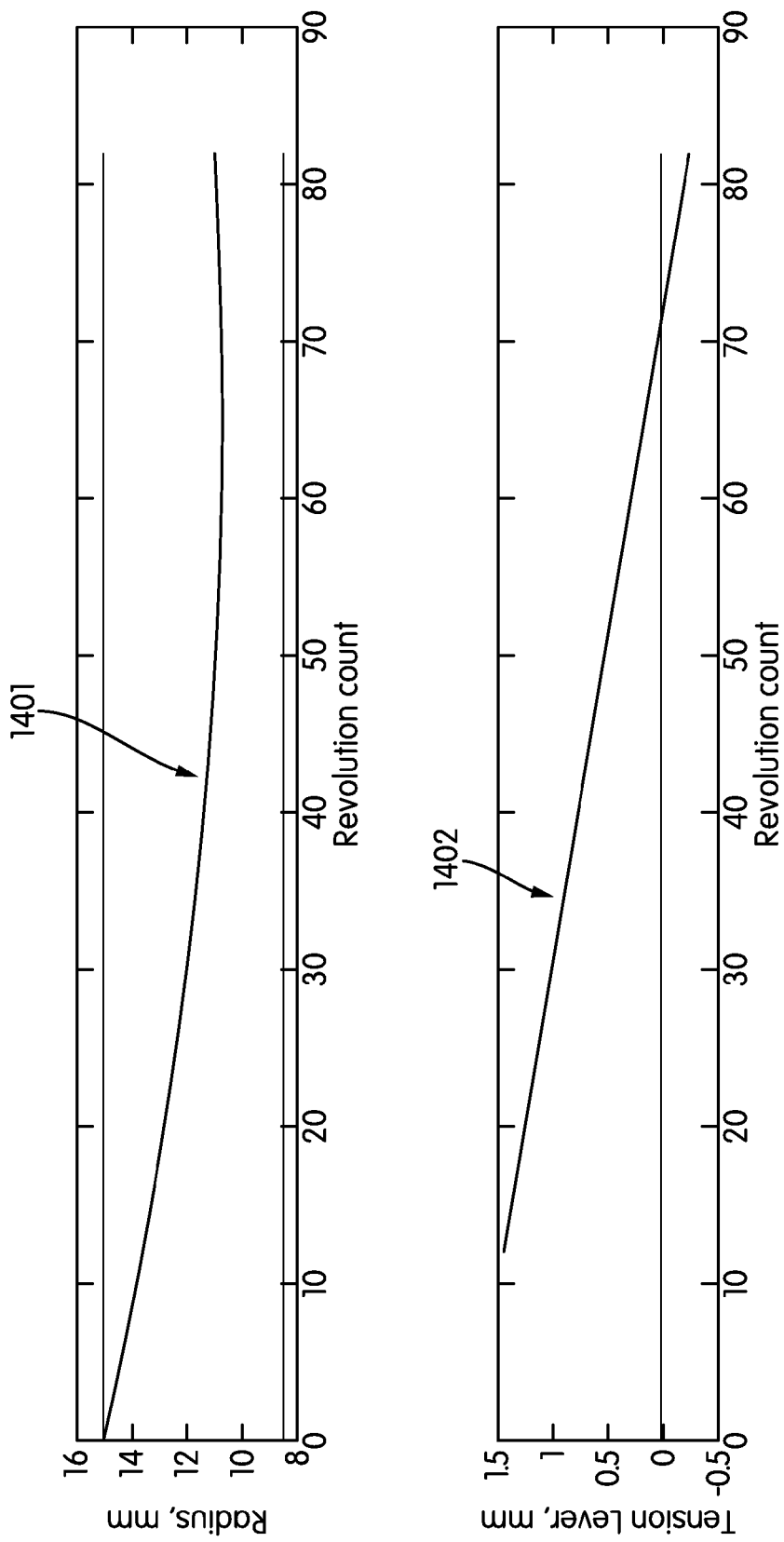
FIG. 14 shows graphs of the radial profile of the non-linear rotor of FIG. 13 plotted as a function of rotation number, in accordance with exemplary inventive embodiments.

FIG. 13 depicts a non-linear rotor, in accordance with exemplary inventive embodiments. This rotor 1301 exhibits a taper angle which increases along the profile towards the thicker end of the rotor. Depicted in FIG. 14 is the radial profile 1401 or radial distance of the peripheral wall of rotor 1301 as a function of rotation number and the effective mechanical advantage 1402, which is directly related to the taper angle. The higher the value of the curve 1402, the faster and weaker the motion of the linear output will be, given constant torque and rotational velocity of the rotor. The behavior of rotor 1301 is such that from an extended position of the differential drive, represented by the far right of each plot, as the rotor 1301 is rotated and the differential drive contracts, the coils move up the profile to the left and they experience a steeper and steeper taper angle which increases the linear velocity of the output. It will also weaken the force output, if the rotor 1301 is driven at a constant torque and angular velocity. A differential drive assembly configured with this particular rotor geometry will provide higher forces near extension, and higher speed near contraction.

Figure 15:
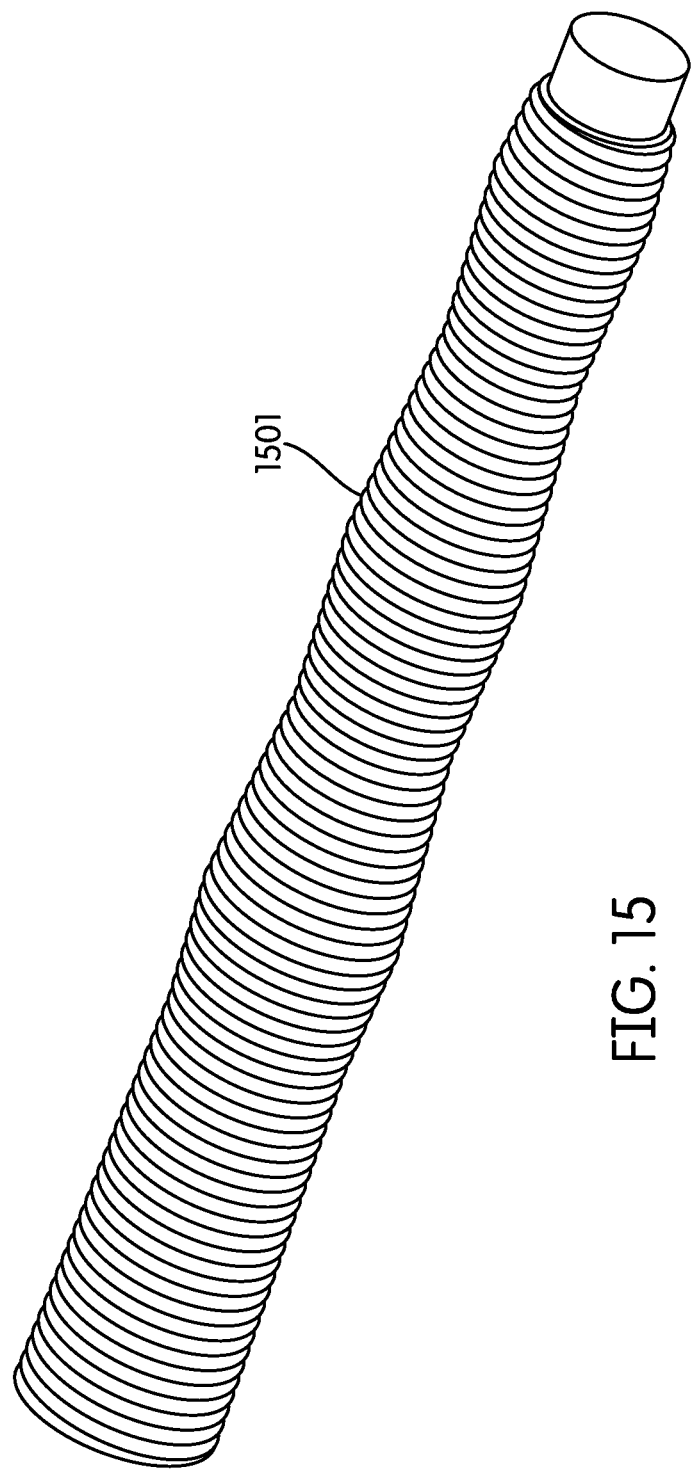
FIG. 15 is another non-linear rotor having hold positions, in accordance with exemplary inventive embodiments.
Figure 16:
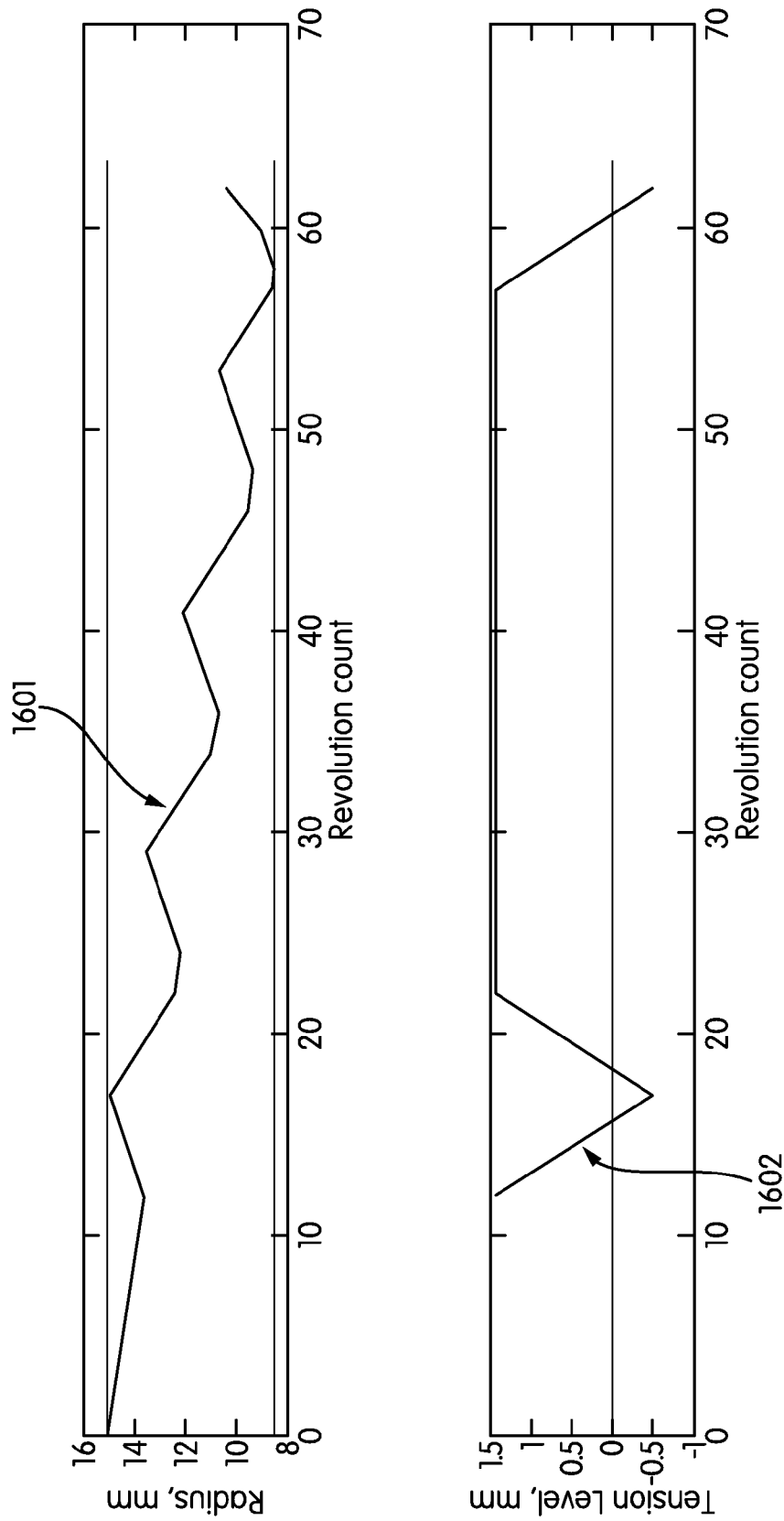
FIG. 16 shows graphs of the radial profile of the non-linear rotor of FIG. 15 having hold positions, in accordance with exemplary inventive embodiments.

FIG. 15 is another non-linear rotor having hold positions, in accordance with exemplary inventive embodiments. Rotor 1501 provides holding positions which require no torque from the rotary source (e.g. an electric motor) in order to hold a linear position under load. FIG. 16 shows the radial profile 1601 or radial distance of the peripheral wall of rotor 1501 as a function of rotation number and the mechanical advantage plot 1602 of rotor 1501 where plot 1602 crosses the 0 tension lever line (which corresponds with zero instantaneous output motion). At this position, the linear output remains stationary, even as the rotor 1501 spins at that instant. This is equivalent to a "zero lead" screw. In the horizontal section of the curve 1602 between the drops to zero, regular linear behavior is observed. This behavior is particularly useful and is comparable to a high-efficiency rotary-linear transducer such as a ball-screw that also has holding positions at its expanded and contracted states that do not require a torque from the rotary source. Note that these holding positions could be placed in various locations and extend for various distances or periods as desired.

Figure 17:
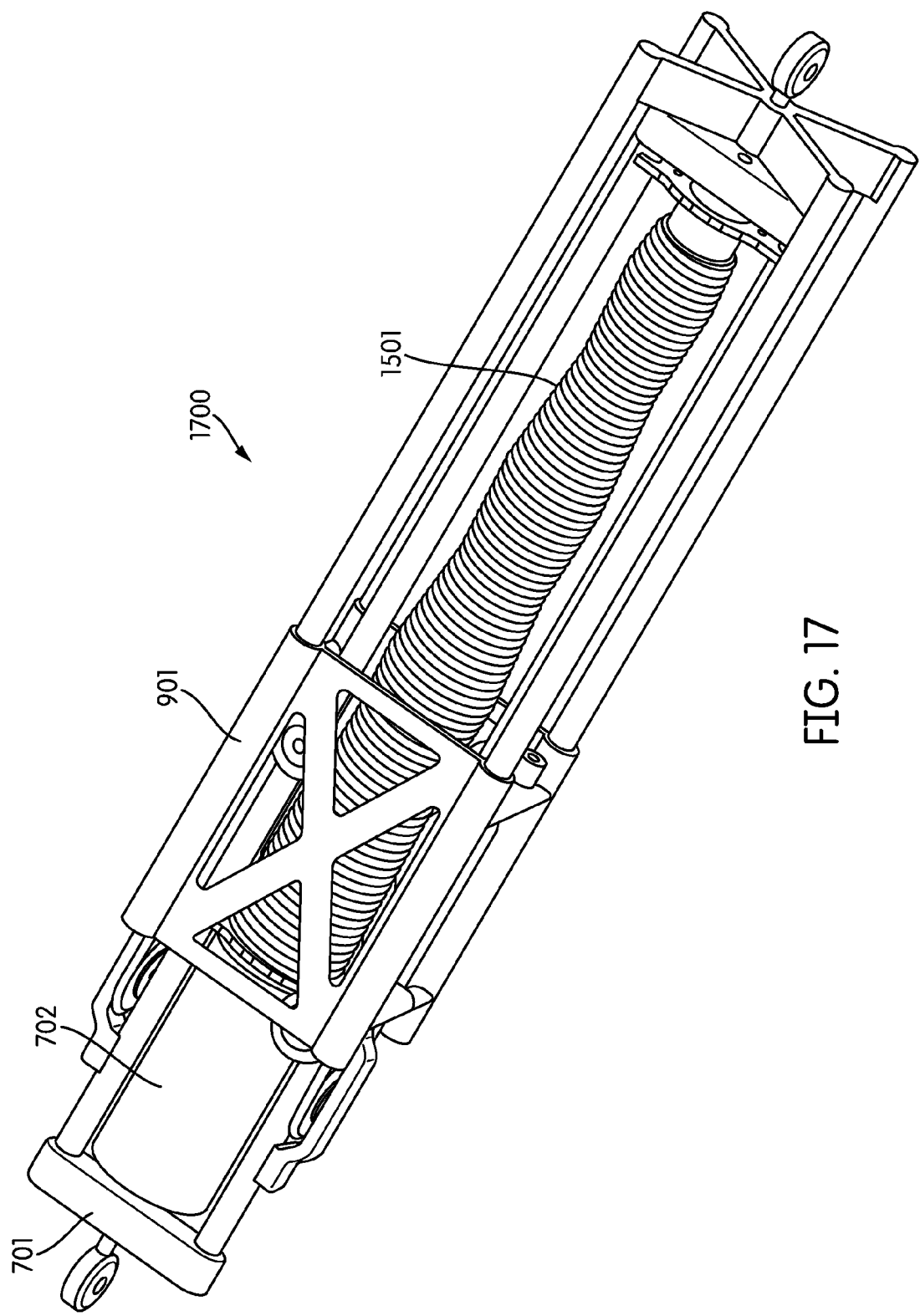
FIG. 17 depicts the non-linear rotor of FIG. 15 configured in a differential drive assembly include a carriage assembly and a base assembly, in accordance with exemplary inventive embodiments.

FIG. 17 depicts the non-linear rotor 1501 of FIG. 15 configured in a differential drive assembly 1700 including carriage assembly 901 and base assembly 701, in accordance with exemplary inventive embodiments. Differential drive assembly 1700 includes rotor 1501 mounted in a fashion similar to the linear rotor 201 of the differential drive assembly 1100 and simply requires the rotor to be allowed to move freely along its axis as described previously.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of spring systems or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, describes techniques, or the like, this application controls.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A drive assembly comprising:
    a rotor having a rotor axis about which the rotor is configured to rotate, the rotor having rotor sections with different radii;
    a base coupled to the rotor;
    a carriage movably coupled to the base to slide parallel to the rotor axis;
    a flexible element coiled about the rotor and extending from the rotor to the base, to the carriage, and back to the rotor.

2. The drive assembly according to claim 1, further comprising a motor positioned in the base, the motor coupling the rotor to the base, the motor configured to rotate the rotor about the rotor axis with respect to the base.

3. The drive assembly according to claim 1, wherein the rotor is configured to slide on a shaft along the rotor axis with respect to the base.

4. The drive assembly according to claim 1, wherein the carriage surrounds at least a portion of the rotor.

5. The drive assembly according to claim 1, wherein the base includes a plurality of pulleys.

6. The drive assembly according to claim 1, wherein the carriage includes a plurality of pulleys.

7. The drive assembly according to claim 1, wherein the rotor has at least one groove for receiving the flexible element.

8. The drive assembly according to claim 1, wherein the rotor has at least two grooves for receiving the flexible element.

9. The drive assembly according to claim 1, wherein the rotor has a profile having non-linear changes in the rotor radius.

* * * * *